United States Patent [19]

Murakami

[11] Patent Number: 4,853,509
[45] Date of Patent: Aug. 1, 1989

[54] RICE COOKER FOR MICROWAVE RANGES

[75] Inventor: Tatsuo Murakami, Chiba, Japan

[73] Assignee: Hario Kabushiki Kaisha, Tokyo, Japan

[21] Appl. No.: 195,835

[22] Filed: May 19, 1988

[30] Foreign Application Priority Data

Nov. 18, 1987 [JP]  Japan .............................. 62-176207[U]

[51] Int. Cl.⁴ ............................................. H05B 6/80
[52] U.S. Cl. ....................... 219/10.55 E; 219/10.55 R; 99/451; 99/DIG. 14; 426/243
[58] Field of Search ................. 219/10.55 E, 10.55 F, 219/10.55 R; 99/410, 415, 416, 417, 426, 427, 448, 449, 451, DIG. 14; 426/241, 243

[56] References Cited

U.S. PATENT DOCUMENTS

| | | | |
|---|---|---|---|
| 3,987,267 | 10/1976 | Moore | 99/451 X |
| 4,039,797 | 8/1977 | Olsen | 99/448 X |
| 4,413,167 | 11/1983 | Martel et al. | 99/451 X |
| 4,477,705 | 10/1984 | Danley et al. | 219/10.55 E |
| 4,481,392 | 11/1984 | Nibbe et al. | 99/DIG. 14 |
| 4,486,640 | 12/1984 | Bowen et al. | 219/10.55 E |
| 4,532,397 | 7/1985 | McClelland | 219/10.55 E |
| 4,728,762 | 3/1988 | Roth et al. | 219/10.55 E |

Primary Examiner—Philip H. Leung
Attorney, Agent, or Firm—Holman & Stern

[57] ABSTRACT

A rice cooker for preparation of shaped foods of rice in a microwave range is made of microwave permeable synthetic resin such as polypropylene and internally provided with mutually separate confined spaces of a fixed capacity and adapted for accommodating rice with water. As the rice cooker containing uncooked rice with water is heated in the microwave range, compression acts on the boiled rice due to pressure contact of the boiled rice swelled with water with walls defining the spaces and the boiled water is automatically shaped in the spaces. Absence of direct contact of the rice with user's hand during the process enables preparation of shaped foods of rice such as rice balls without any keen pain and blemish on the hands.

2 Claims, 3 Drawing Sheets

RICE COOKER FOR MICROWAVE RANGES

BACKGROUND OF THE INVENTION

The present invention relates to a rice cooker for microwave ranges, and more particularly relates to a cooker for boiling rice in microwave ranges and well suited for preparation of shaped foods of rice such as rice balls.

In the conventional way of preparing a shaped food of rice, a mass of hot rice just after boiling is shaped directly by hands. This way of preparation by hand, however, gives keen pain to the hands and uncomfortably blemishes the hands, since the rice is extremely hot and very sticky just after cooling. It is however unpractical to prepare such a food after rice has more or less cooled since rice, as its basic nature, swiftly loses cohesiveness and taste with cooling.

SUMMARY OF THE INVENTION

It is the basic object of the present invention to provide a rice cooker for microwave ranges which enables easy preparation of shaped foods of rice without any direct contact of user's hands with rice.

It is another object of the present invention to provide a rice cooker for microwave ranges which is in particular suited for preparation of shaped foods of rice with no keen pain and blemish on users' hands.

In accordance with the basic aspect of the present invention, a rice cooker is substantially made up of a microwave permeable bowl suited for accommodating water, a microwave permeable, perforated rice container detachable encased within the bowl, and a lid for closing the bowl.

DESCRIPTION OF THE PREFERRED EMBODIMENTS

Figure 1:
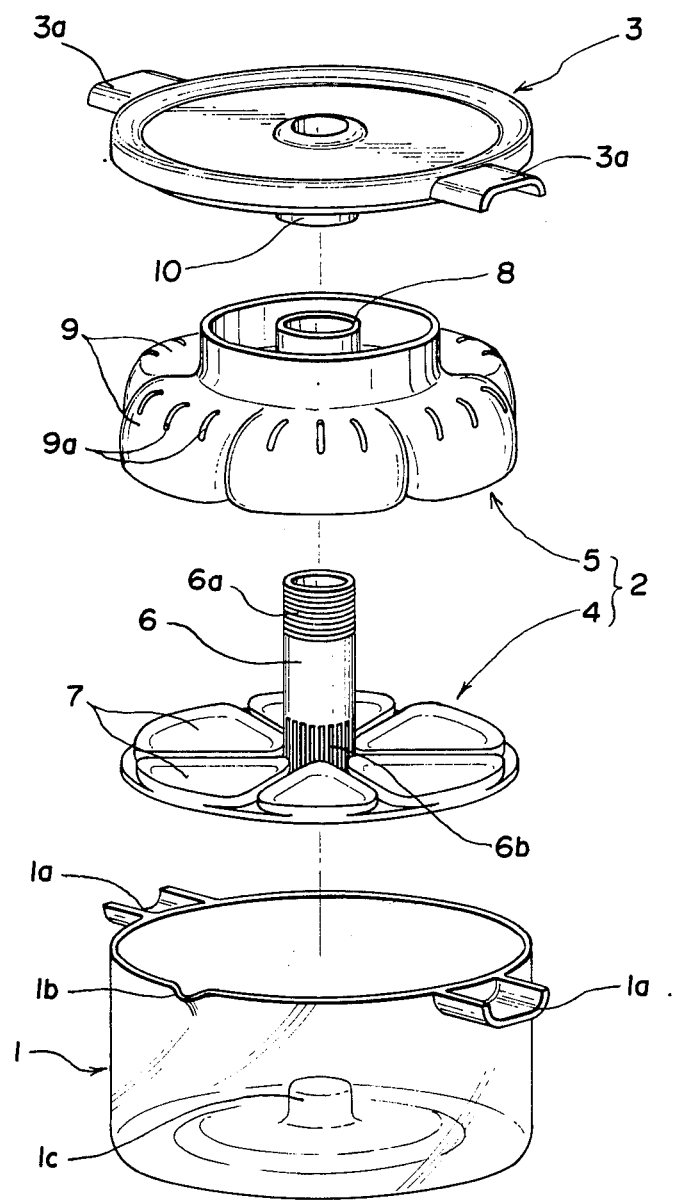
FIG. 1 is a perspective view of one embodiment of the rice cooker in accordance with the present invention in a disassembled state.

One embodiment of the rice cooker in accordance with the present invention is shown in FIG. 1, in which, as briefly stated above, the rice cooker is made up of a bowl 1, a rice container 2 to be encased within the bowl 1, and a lid 3 for closing the bowl 1.

The bowl 1 is made of microwave permeable but heatproof synthetic resin such as polypropylene and provided at its upper open end with a pair of ears 1a. A pour 1b is preferably formed in the upper edge of the bowl 1 and an inner projection 1c is formed on the bottom.

Figure 2:
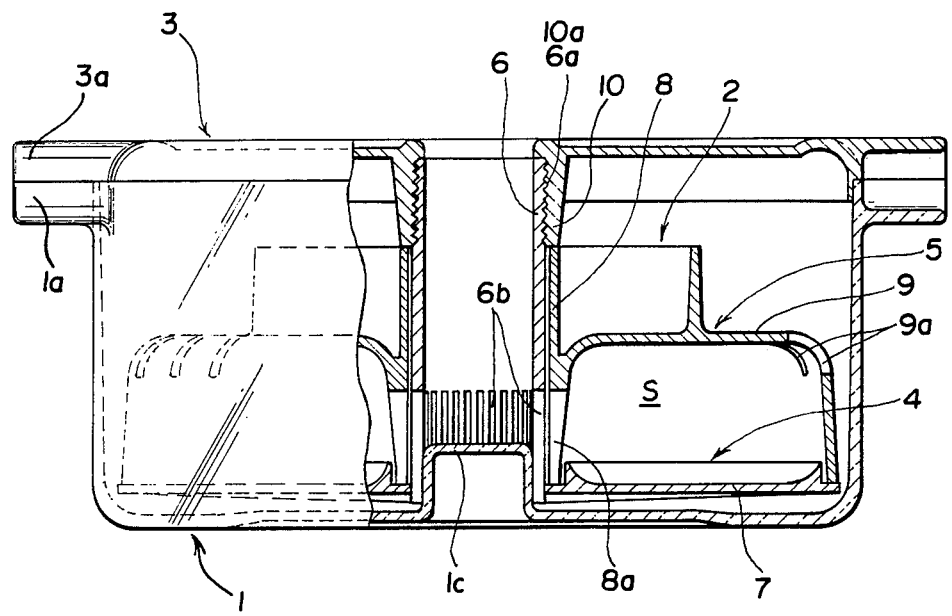
FIG. 2 is a side view, partly in section, of the rice cooker in the assembled state.

The rice container 2 is made up of lower and upper trays 4 and 5 which are to be separably combined with each other. These trays are again made of microwave permeable but heatproof synthetic resin such as polymethyl pentene or polysulfon. The lower tray 4 is provided with an upstanding center tube 6 for introduction of water. The center tube 6 is provided at its top end with a thread 6a and, near its lower ends, with a plurality of circumferentially juxtaposed longitudinal slots 6b for passage of water. A plurality of shallow receptacles 7 are formed on the bottom of the lower tray 4 surrounding the center tube 6. The lower end of the center tube 6 is configured to be insertable over the inner projection 1c on the bottom of the bowl 1 which the latter is assembled with the rice container 2. The upper tray 5 is given in the form of an inverted bowl and provided with a center tube 8 which is insertable over the center tube 6 on the lower tray 4. A plurality of cover sections 9 are circumferentially juxtaposed surrounding the center tube 8 and the upper edges of the cover sections 9 define an annular opening around the top end of the center tube 8. The lower edges of the cover sections 9 form the bottom end of the upper tray 5 insertable over the outer edge of the lower tray 4. When the upper and lower trays are assembled together, each cover section 9 of the upper tray 5 covers a corresponding receptacle 7 of the lower tray 4 to define an independent, confined space S for accommodating rice. The cover section 9 is provided with at least one slit 9a small enough to refuse free passage of the rice out of the space S. As best seen in FIG. 2, the center tube 8 is provided near its bottom end with separate water inlets 8a at positions corresponding to the spaces S. In the case of the illustrated example, the lower tray 4 has six receptacles 7, the upper tray 5 has six cover sections 9 and, as a consequence, six independent spaces S are formed in the rice container 2 when the upper and lower trays 5 and 4 are assembled together.

The lid 3 is made of microwave permeable but heatproof synthetic resin such as polypropylene. The lid 3 is provided with a pair of ears 3a and a center tube 10 projecting downwards. The center tube 10 is open at both ends and provided with an inner thread 10a engageable with the thread 6a on the center tube 6 of the lower tray 4. The lid 3 is brought into such thread engagement with the center tube 6 of the lower tray 4 after assembly of the upper and lower trays 5 and 4 to fasten them together tightly. The lid 3 is sized to close the top open end of the bowl 1 when the fastened combination of the three elements 3 to 5 is placed in the bowl 1 after the assembly. Further, the rice cooker is preferably sized so that about half of each space S should correspond to the amount of uncooked rice necessary for preparation of one piece of compressed food.

Figure 3A:
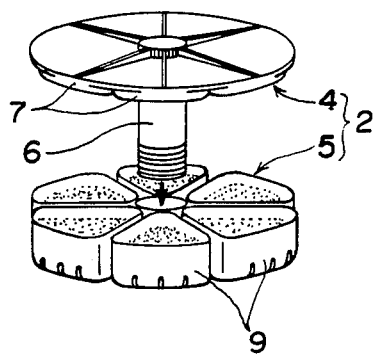
FIGS. 3A to 3F are views for showing sequential steps in preparation of shaped food of rice using the rice cooker in accordance with the present invention.
Figure 3B:
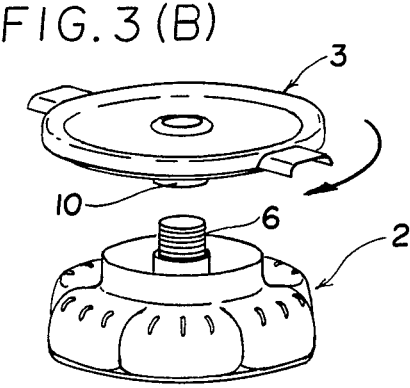
Figure 3C:
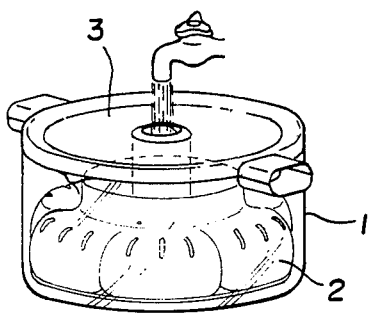

In preparation of shaped foods, e.g. rice balls, the upper tray 4 is inverted and placed on a given base, rice of the above-described amount is put into the cover sections 9 and the lower tray 5 is assembled in position with the upper tray 4 as shown in FIG. 3A. Next, the upper and lower trays 5 and 4 are turned upside down and the lid 3 is brought into thread engagement with the center tube 6 on the lower tray 4 in order to fasten the trays 5 and 4 together as shown in FIG. 3B. Then the fastened combination of the three elements 3 to 5 is placed in the bowl 1 and proper amount of water is supplied into the center tube 6 via the center tube 10 of the lid 3 as shown in FIG. 3C. During supply of water, the bowl 1 is shaken by hand in order to cleanse the rice in the spaces S. Thus, the rice can be cleansed without drenching hands. After cleansing, extra water is discharged to an extent such that the level of the water in the bowl 1 should be just above the cover sections 9 of the rice container 2.

Figure 3D:
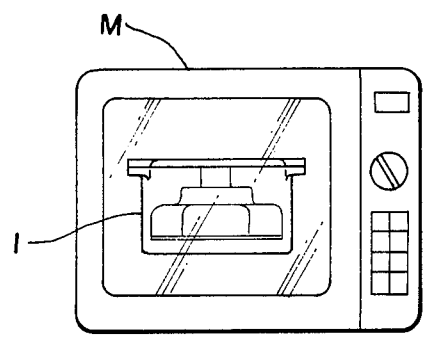
Figure 3E:
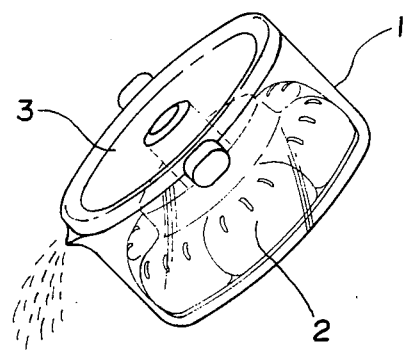
Figure 3F:
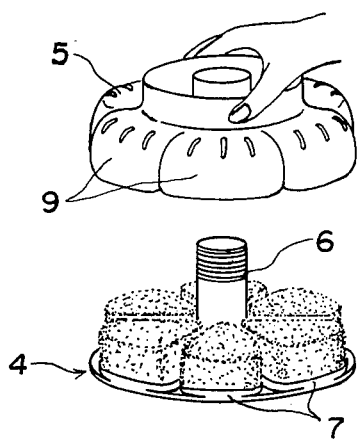

Then, the rice cooker is placed in position in a microwave range M for boiling as shown in FIG. 3D. During this boiling, the rice in the spaces S swells great deal absorbing the water. Since the dimension of each space S remains substantially unchanged during the boiling, the rice in the space S is automatically compressed due to pressure contact with the walls defining the space S to take the form of a shaped food corresponding to the configuration of the space S. After complete boiling extra water is discharged via the pour 1b in the bowl 1 as shown in FIG. 3E. Without removing the lid 3, the rice cooker is left for a while for steaming of the heated rice. Thereafter, the lid 3 is removed, the rice container 2 is taken outside the bowl 1 and the upper tray 5 is disassembled from the lower tray 4 as shown in FIG. 3F in order to obtain shaped foods, e.g. six rice balls.

Since the rice cooker is totally made of synthetic resin, salty water may be used for boiling rice. In a modified embodiment of the present invention, one or more small inner projections are formed on the cover sections 9 and/or the receptacles 7 of the rice container 2. In this case, corresponding depressions are formed in the surface of each shaped food which is suited for receiving side foods such as pickles.

In accordance with the present invention, all steps of the process are carried out in the rice cooker without any direct contact of user's hand with rice, preparation of shaped foods of rice causes no keen pain and blemish on the hands of the users. In addition, the rice cooker can be directly placed in microwave ranges for boiling of rice, since it is made of microwave permeable but heatproof synthetic resin. Further, uncooked rice can be cleansed with water in the rice cooker without drenching user's hands.

I claim:

1. A rice cooker for microwave ranges comprising:
a microwave permeable bowl,
a perforated, microwave permeable rice container detachable encased in said bowl and internally provided with at least two spaces suited for accommodating rice, and
a lid closing the top open end of said bowl in detachable engagement with said rice container in which said rice container is made up of a pair of counterparts which are separable combined with each other in order to internally define said at least two spaces, and
at least one of said counterparts is provided with at least one slit for passage of water therethrough in which said pair of counterparts are lower and upper trays,
said lower tray includes an upstanding first center tube and a plurality of receptacles circumferentially juxtaposed around said first center tube,
said first center tube is provided at its top end with a first thread and, near its bottom end, a plurality of circumferentially juxtaposed longitudinal slots,
said upper tray is provided with a second center tube and a plurality of cover sections circumferentially juxtaposed around said second center tube,
the number of said cover sections is equal to that of said receptacles so that each said cover section defines each said space in combination with each said receptacle,
said second center tube is provided near its bottom end with water inlet opening in said spaces, and
said lid is provided with a third center tube extending downwards and having an inner thread engageable with said thread on said first center tube on said lower tray.

2. A rice cooker as claimed in claim 1 in which
said bowl is provided at its bottom with an inner projection, for receiving
the bottom end of said first center tube on said lower tray over said inner projection.

* * * * *